July 10, 1934.   E. C. LAMLEIN ET AL   1,965,705
HUMIDITY REGULATOR
Filed Aug. 27, 1930   2 Sheets-Sheet 1

INVENTORS
Edward C. Lamlein
Rudolph Miller
BY Swan + Frye
ATTORNEYS

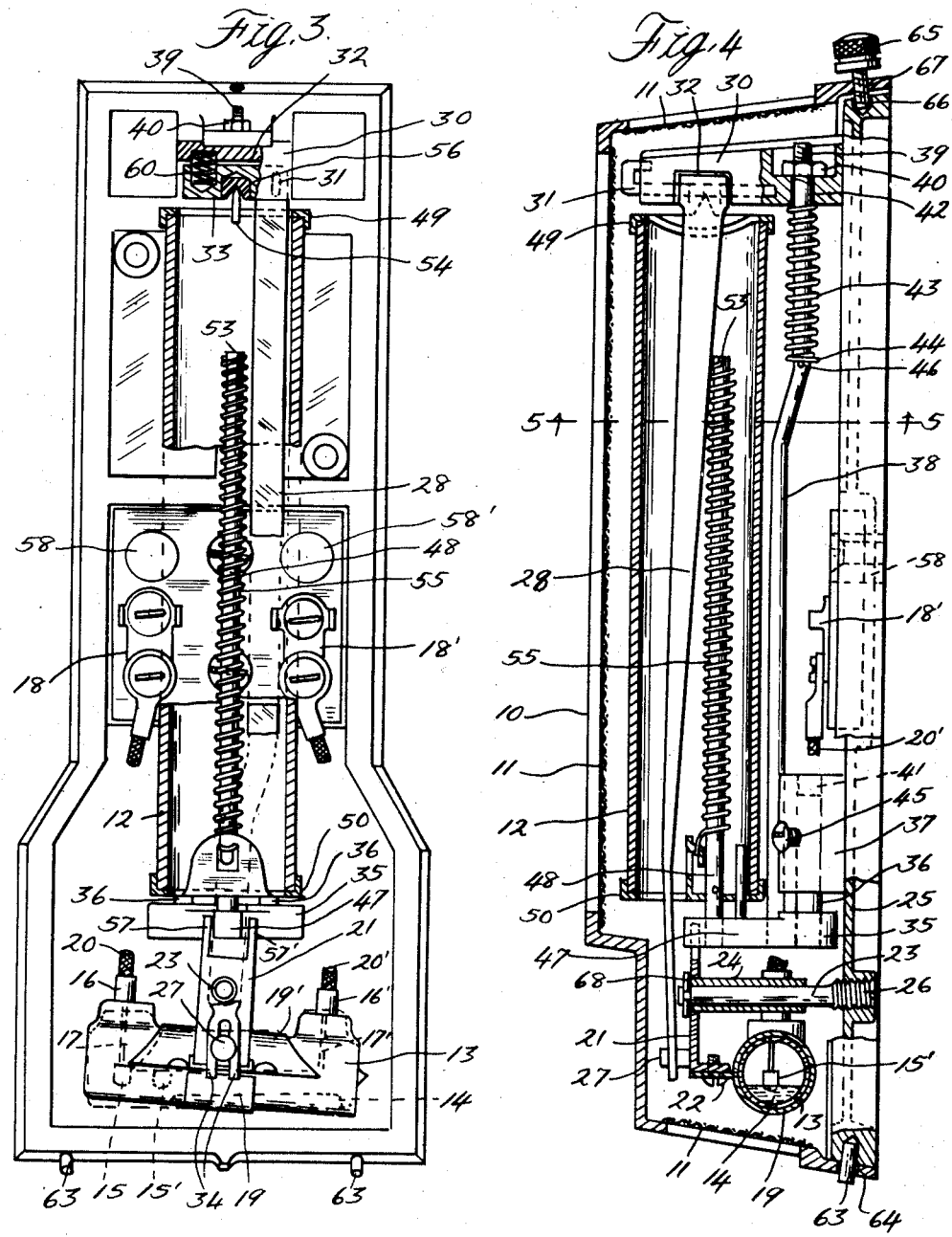

Patented July 10, 1934

1,965,705

UNITED STATES PATENT OFFICE 1,965,705

HUMIDITY REGULATOR

Edward C. Lamlein and Rudolph Miller, Detroit, Mich., assignors, by mesne assignments, to Edward C. Lamlein, Detroit, Mich.

Application August 27, 1930, Serial No. 478,166

5 Claims. (Cl. 297—1)

This invention concerns automatic controls, and relates more particularly to a mechanism of this class which is adapted to be responsive to changes in the condition of the atmosphere surrounding it, and which includes a switch which may be so adjusted as to be automatically thrown to open or close an electrical circuit when the humidity of the air around it rises above or falls below certain desired levels.

As is well known, the humidity of the atmosphere is ordinarily graded on a scale of one hundred, in which 100 represents the dew point, and zero represents dry air. Medical and laboratory research has determined that the most healthful condition exists, as regards the welfare of human beings, when the humidity of the air does not fall below approximately 45 on this scale. It is also preferable that it should not rise above about 65, as when this percentage is exceeded to any great extent, condensation will be observed, first, of course, on colder objects, such as windows and pipes.

One of the principal objects of our invention, therefore, is to provide an automatic control switch which will close an electrical circuit when the humidity falls below a desired minimum. Connected in this electrical circuit may be a humidifier of any desired construction, which will be set in operation by the closing of the circuit to further humidify the air in any suitable manner, as by generating steam. Our present invention is not concerned with humidifiers per se, but solely with an automatic switch control mechanism suitable for energizing one or more humidifiers.

It is also an object of our invention to provide such an automatic switch control which will shut off the humidifier automatically when the desired humidity has been reached.

Another object of this invention is to produce such a regulator which may be adjusted to operate at any desired points on the humidity scale, so that the limits within which the humidity is to be kept, in the room or building in which a humidifying system is installed, may be controlled to suit the will of the user by the automatic action of our improved switch.

A further object of this invention is the production of such a switch in which the controlling medium designed to be affected by changes of humidity will present a maximum surface to the air, and will be rapid and positive in operation.

Other objects and advantages will be apparent from the following description, wherein reference is made to the accompanying drawings illustrating a preferred embodiment of our invention and wherein similar reference numerals designate similar parts throughout the several views.

In the drawings:

Figure 3 is a front view, partly elevational and partly sectional, of our device with the cover removed.

Figure 4 is a side elevational view, also partly in section, with the cover in position.

Figure 1:
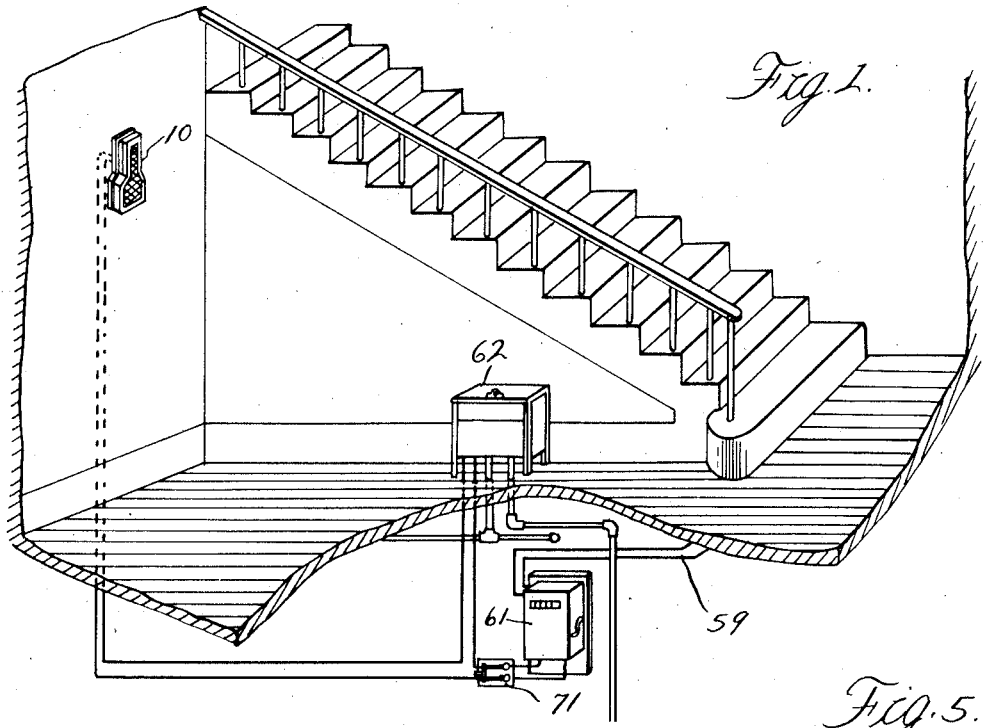
Figure 1 is a perspective view of a portion of the interior of a house, showing a typical use of our invention for controlling a humidity-regulating system, which is shown in its entirety and partly schematically.
Figures 2, 5, 6:
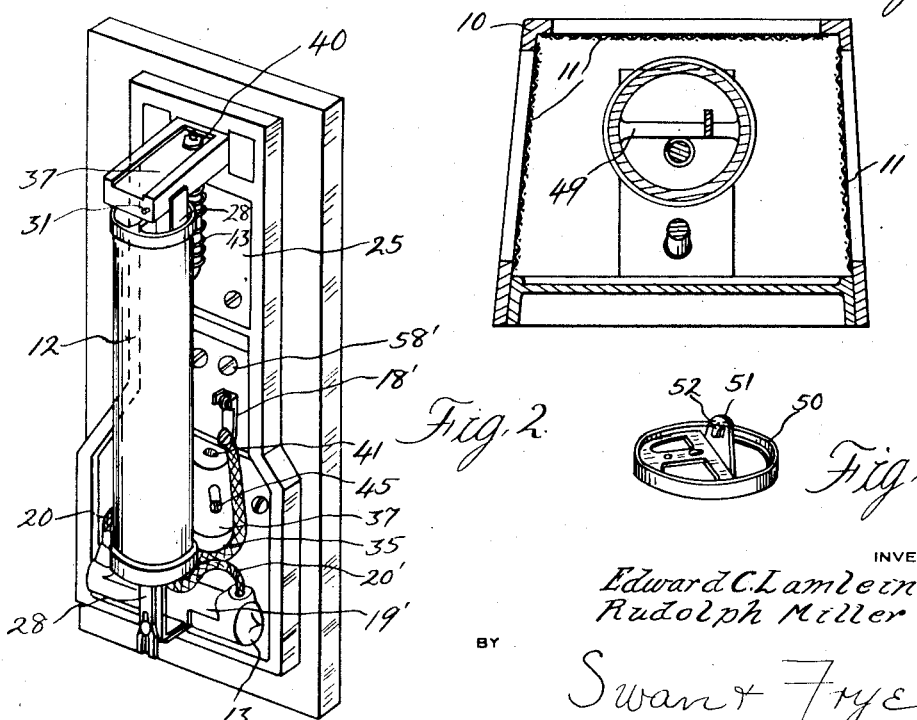
Figure 2 is a perspective view of our improved automatic switch regulator, which forms the subject of this invention, with the cover removed.
Figure 5 is a cross-sectional view taken substantially on the line 5—5 of Figure 4, and looking in the direction of the arrows.
Figure 6 is a detail perspective view of the lower tube-retaining and reinforcing cap.

Referring now to the drawings:

Reference character 10, Figures 1, 4, and 5, indicates an outer protective cover for the device, which may of course be designed to also be ornamental, but substantially all the faces of which are apertured, or are open and provided with grilles or screening, as shown at 11, to allow free passage of air through the device and around the interior parts.

The actual control device which is responsive to humidity changes, is composed of a hollow sleeve or tubular member 12, formed of a substance which expands and contracts with the addition thereto and subtraction therefrom of moisture. For this purpose porous wood, which swells when moistened and contracts while drying, serves well. The best substance we have thus far found for this use is first quality kiln dried gum wood, which is cut across the grain. Obviously the greatest amount of expansive and contractive movement of such a tube, under varying moisture conditions, will be longitudinal. The general functional aim of our device is of course to control an electrical switch by means of such longitudinal movement of the controlling tube. For this purpose a mercury switch 13 is used, which is of well known construction, having a body of mercury 14 trapped within a tiltable tube, and a pair of spaced contacts, 15—15' within the tube at one end. Obviously when the mercury touches and bridges the space between the two contacts, an electrical circuit may be completed, as each contact is connected by means of supporting and conducting wires (17—17') to a separate external terminal (16—16') on the outside of the tube. The mercury is controlled in its movement within the tube by balancing the latter in such manner that by tilting the tube it may be made to flow from one end to the other thereof, and consequently into and out of engagement with the contacts 15 and 15'. Flexible or "pig-tail" connections 20—20' run from the switch terminals 16—16' to binding posts 18—18', which may be connected in the circuit to be controlled by our humidity regulator. The switch is balanced by being mounted and held within the supporting saddle 19. The saddle is formed with an integral upper portion 19', the entire device being formed of a sheet metal strip which completely encircles and firmly holds the switch, by reason of its contouring, which is clearly shown in Figures 2 and 3. The saddle and the switch are cradled by being supported from the lever 21, as by means of the bolt 22, which is best shown in Figure 4, and which secures the cradle to the lever. The lever 21 is pivoted on the pivot pin 23, being connected to or integral with the sleeve 24, which is journaled on the pin, (Figure 4). The pin 23 is supported from the main supporting back plate or frame 25 in any suitable manner, as by having a threaded head portion 26 which is screwed into a suitably tapped hole in the back plate. A key or clip 68 holds the unitary sleeve and lever on the pivot pin, which is grooved at its end for reception of the clip, (Figure 4). Swinging of the supporting lever 21, and consequent tilting of the mercury switch, is accomplished through the pin 27, affixed to the front of the lever and projecting therefrom as shown in Figures 3 and 4. The pin is motivated by the long depending lever arm 28, which is part of a bellcrank-lever pivotally supported upon the fixed bracket 30, which projects from the upper portion of the back plate 25. The lower extremity of the lever is bifurcated as at 34 to engage the pin. The long lever arm is shown partly broken away in Figure 3, to more clearly bring out other features of construction, the broken-away portion being indicated in dotted lines. The under side of the projecting bracket is laterally grooved, as at 32, for reception of the upper extremity of the lever and its short arm 33, which is preferably integral therewith. The common axis of the bellcrank 28—33 thus formed is the fulcrum pin 31, about which the long depending arm 28 may be laterally swung, (and from which it would depend in a pendulous manner if its movement were not restricted) while the corresponding movement of the short arm 33 would of course be vertical. The compression spring 60 normally urges the short arm of the bellcrank downwardly, and the long arm to the right, simultaneously bearing upwardly against bracket 30, (Figure 3). The spring may be housed and retained by the lever arm and bracket by boring them to the proper depth, as shown. The normal tendency of the spring 60 is thus to incline the switch to the left, or "on" position.

A lower supporting bracket 35 is vertically reciprocable on slidable supporting rods 36 which are firmly affixed to the bracket and slide freely in vertically drilled apertures 41 in the bearing block 37 which projects from the back plate 25 (Figures 2, 3, and 4). The position of the lower bracket may be adjusted and fixed from the upper fixed bracket 30 by means of the rod 38, which is fixed to the lower reciprocable bracket and projects upwardly and through aperture 42 in the upper bracket, in which it slides freely. The upper extremity of the rod 38 is screw-threaded as at 39, for accommodation of the adjusting nut 40, which is fitted thereon, and by means of which the lower bracket may be moved up and down at will. The movement is rendered more positive and the parts held in firm engagement with each other by the compression spring 43, which bears upwardly against the bottom of the upper fixed bracket, and urges the rod 38 downwardly by bearing against the washer 44 which is held in place by the pin 46. A set-screw 45 may be inserted in the bearing block 37 to more firmly fix the position of the adjustable lower bracket when the desired adjustment has been attained. The lower movable bracket 35 carries a forwardly extending arm 47, which supports, and from which rises vertically the rod or post 48, which serves as the main support for the humidity-sensitive control tube 12. Each end of the tube 12 is fitted with a cap, (49, 50) which is entirely open, except for its outer rim and central spider or web-like supports—the open construction being used in order that air may circulate freely within the tube. The lower cap, 50, which is shown in perspective in Figure 6, carries the central rising ear 51, from which a tongue 52 is struck out for engagement with the lower end of the tension spring 55, which may be hooked beneath it. The other or top extremity of the spring engages the top of the upstanding post 48, and is held in any suitable manner, as by aperturing or notching the end of the rod (53) and inserting the end of the spring in it, as shown in Figures 3 and 4. It will thus be seen that the spring 48 continually urges the tube 12 upwardly to a greater or less degree, depending upon the adjustment of the bracket 35, and that since the rod 48 is carried by the bracket 35, the upward pull which the spring exerts upon the tube through the lower cap 50 increases directly as the adjustable bracket 35 is elevated in position, and vice versa.

We consider it advisable to construct the post 48 of metal having a higher coefficient of expansion than the back plate, and adapted to expand in the opposite direction to an extent sufficient to compensate for and neutralize the effect of the expansion of the back plate. Thereby expansion and contraction of the metal parts of the device under temperature changes cannot affect the positioning of the tube and switch.

The top of the tube is also capped with a cap of relatively open construction, 49, (the open construction of which appears best in Figure 5) which carries at its approximate center the upstanding bearing pin 54, here shown as pointed. Only through the bearing 54—56 has the top of the tube any engagement with the rest of the structure, nor has the rest of the tube any engagement other than that through the agency of the lower cap, just described. The bearing pin 54 is urged upwardly against the short arm of the lever, as shown in Figure 3, under the influence of the spring 48, acting through the tube, and the pin serves to position the tube by engaging in a complementarily concaved bearing 56 carried by the short arm of the lever. The actual bearing socket may be made of harder and more wear-resisting material than the balance of the lever, as a jewel, or case hardened or crucible steel, and set in as shown in Figure 3. Obviously, if the upward pressure of the pin 54 becomes sufficient to overcome the downward pressure of the spring 60, the long arm 28 of the lever will be thrown to the left, and the mercury switch inclined to the right or "off" position. The tilting movement of the mercury switch is limited by the tine-like arms 57—57' extending integrally from the edges of the lever 21, and which are formed by bifurcating the upper extremity of that lever, the tines being formed to restrictively engage the forwardly projecting support 47 for the post 48 carried by the bracket 35, as appears in Figure 3; the tilting movement being sufficient in extent to allow the mercury to flow from one end to the other when the instrument is substantially level and the cradle is rocked.

It will be apparent that the upward movement of the upper cap 49 with sufficient pressure to swing the lever arm 28 to the left, or downward movement of the upper cap sufficiently to cause its movement to the right under the influence of the spring 60—either of such movements, not only might be caused by adjustment of the bracket 35, but might also be the result of expansion or contraction of the tube 12, and this is of course especially true if the bracket 35 is adjusted so that the upward and downward pressure on the short arm of the lever are substantially equal and balanced. It is exactly this expansion and contraction (humidity-induced) to which the instrument is desired to be responsive, and this sensitive condition is made possible by the adjustability of the lower supporting bracket 35. The principal reason for supporting the control tube by means of the spring 55, rather than by affixing the bottom of the tube directly to the bracket 35, is to allow yieldability to prevent damage to the tube or instrument in event the swelling of the tube should continue after the extreme limit of movement of the bellcrank 28—33 is reached. The normal adjustment of the position of the bracket 35 is such that when the tube contains atmosphere, and consequently the tube, contains sufficient moisture for healthful conditions, the upper cap bears upwardly against the short arm 33 of the lever with just sufficient force to barely overcome the pressure of the spring 60 and maintain the long arm 28 in the left position, and the switch consequently off. Hence any material contraction of the tube 12, caused by drying out, will relieve the upward pressure against the lever 33, and permit the spring 60 to throw the switch to the "on" position, by forcing the long arm of the lever to the right.

Suitable apertures, 58—58' are provided through the back plate 25 adjacent the binding posts, for the passage of connecting wires therethrough, and when these are connected to a source of current and an electrically motivated humidifier to correct the dry condition of the air, it is obvious that contraction of the control tube 12 will complete the circuit and start the humidifier, which will run until the air has absorbed sufficient moisture, which will cause the tube to again swell to its normal size, thereby pushing the cap 49 upwardly against the lever with sufficient force to tilt the switch, break the circuit, and shut off the humidifier. A suitable method of connection is shown in Figure 1, in which a power line 59 indicates the source of current, which passes through a meter 61, and a disconnect switch and fuse block 71, of the usual type, the output of which is fed to my improved regulating unit and the humidifier 62, which are here connected in series. The regulator (only the casing 10 appearing) is shown on the wall near a stairway, in which position the passage of air currents is often sufficiently great to allow control of humidity both upstairs and down. Obviously, however, our control unit might be used to operate more than one humidifier or similar device, and if desired the direct control may be by an intermediate relay, actuated by the mercury switch. This is of course desirable electrical practice when a greater load is applied to the switch than it can well handle, but has no bearing on the invention itself.

The casing 10 may be secured upon the instrument in any desired manner, as by aperturing the bottom of the casing at 64 for the reception of cooperating projections or studs 63 carried by the back plate, over which the casing may be slipped, and when the top portion has been pushed inwardly into position, the thumb-screw 65 may be tightened to engage its bolt 67 in the depression 66, firmly fastening the casing to the instrument. The top screening may be omitted from the casing, or apertured, to allow easy access to the adjusting nut 40 with a socket wrench or similar tool, enabling adjustment without removing the cover. The adjustment permits so setting the controlling tube that sufficient contraction thereof to trip the mercury switch will take place at any desired point on the humidity scale.

Thus it will be understood that the use of our improved regulator to control a suitable humidifier produces a system which will automatically maintain the humidity of a room or group of rooms, hall, or other enclosed space, at the most healthful or any desired point; while the peculiarly advantageous construction embodied, including the tube-like sensitive unit and open cap design, make for rapidity of response and positiveness of action; the design also being such that no harm can be done by undue swelling of the moisture-responsive control tube.

While it will be apparent that the illustrated embodiment of our invention herein disclosed is well calculated to adequately fulfill the objects and advantages primarily stated, it is to be understood that the invention is susceptible to variation, modification and change within the spirit and scope of the subjoined claims.

What we claim is:

1. In a hygrostat, a tubular humidity-responsive control member for driving desired mechanism, said member having both its interior and exterior surfaces freely accessible to the atmosphere, and driving means including a lever movable in response to changes of the control member and partially housed within said tubular control member.

2. In a hygrostat, a humidity-responsive control member formed of a porous wooden tube, a mounting for said tube formed to leave both ends thereof open, and means including a lever for transmitting the force generated by humidity-induced changes in the dimensions of the tube, said lever being partially housed by the tube.

3. In a hygrostat, in combination, a hollow moisture-responsive control member expansible and contractible under varying humidity conditions, and means partially housed within and actuated by said controlling member to impart a tilting movement to desired mechanism concomitantly with expansion and contraction of the former.

4. In a hygrostat, an elongated humidity-responsive controlling member having an opening therein, a yieldable support for one end thereof, a lever partially housed within the controlling member and having one arm in engagement with, to support and position as well as for motivation by, the opposite end of the controlling member from the yieldable support, and means relatively more yieldable than said yieldable support for holding said lever arm in engagement with the controlling member, whereby expansion and contraction of said controlling member moves said lever.

5. In a hygrostat, an elongated humidity-responsive controlling member having an opening therein, a yieldable support for one end thereof, a lever having one arm in engagement with the opposite end of the controlling member from said yieldable support, and means relatively more yieldable than said support for holding said lever arm in engagement with the controlling member, whereby expansion and contraction of said controlling member first moves said lever to enable actuation of desired mechanism thereby, the lever and one of said yieldable supporting means being partially housed within the controlling member.

EDWARD C. LAMLEIN.
RUDOLPH MILLER.